(12) United States Patent
Korzan et al.

(10) Patent No.: US 7,421,925 B2
(45) Date of Patent: Sep. 9, 2008

(54) STEERING COLUMN TILT ADJUSTING SYSTEM

(76) Inventors: William Korzan, 44064 Parkside St., Canton, MI (US) 48187; Wayne M Avers, 45723 Tournament Dr., Northville, MI (US) 48167; Steve Waldie, 6906 Alta Dr., Brighton, MI (US) 48116

( * ) Notice: Subject to any disclaimer, the term of this patent is extended or adjusted under 35 U.S.C. 154(b) by 810 days.

(21) Appl. No.: 11/016,006

(22) Filed: Dec. 16, 2004

(65) Prior Publication Data

US 2006/0144183 A1    Jul. 6, 2006

(51) Int. Cl.
   *B62D 1/16*    (2006.01)
(52) U.S. Cl. .............................. 74/492; 74/493; 280/775
(58) Field of Classification Search .................... 74/492, 74/493; 280/775, 777
   See application file for complete search history.

(56) References Cited

U.S. PATENT DOCUMENTS

| | | | |
|---|---|---|---|
| 5,222,410 A | 6/1993 | Kinoshita | |
| 6,481,310 B2 | 11/2002 | Janeczko et al. | |
| 6,591,709 B1 | 7/2003 | Kim et al. | |
| 6,851,332 B2 * | 2/2005 | Bechtel et al. | 74/493 |
| 2004/0041387 A1 * | 3/2004 | Lutz | 280/775 |
| 2004/0245758 A1 * | 12/2004 | Sato et al. | 280/775 |
| 2005/0017492 A1 * | 1/2005 | Ohtsu et al. | 280/775 |
| 2006/0021460 A1 * | 2/2006 | Schulz | 74/493 |
| 2006/0090586 A1 * | 5/2006 | Lee | 74/492 |
| 2006/0156853 A1 * | 7/2006 | Sorensen | 74/492 |

* cited by examiner

*Primary Examiner*—David M Fenstermacher (57) ABSTRACT

A steering column tilt adjusting system for releasably locking a steering column assembly. The pawl is pivotally coupled to the rack and may be pivotally and slidably moved between fully compressed and fully extended positions. The system includes a pawl, a rack, and a pair of side slide plates. Each of the pawl and the rack support a set of rack teeth. The pawl and rack, which are slidable relative to one another, permit adjustment of the system to a fully compressed locked position (teeth of the pawl engaging the teeth of the rack), a fully compressed unlocked position (the teeth of the pawl and those of the rack are not engaged), a fully extended unlocked position (the teeth are not engaged) or a fully extended locked position (the teeth of the pawl engaging the teeth of the rack). In operation, the length of the adjustment system is unlocked, adjusted and relocked to cause the steering column steering wheel to be repositioned as the driver wants.

5 Claims, 6 Drawing Sheets

STEERING COLUMN TILT ADJUSTING SYSTEM

FIELD OF THE INVENTION

The present invention relates to a steering column tilt adjusting system. More particularly, the present invention relates to an apparatus for releasably locking and unlocking a tilt steering column.

BACKGROUND OF THE INVENTION

Steering columns with tilt adjustments have been used on motor vehicles for many years. A variety of adjustment mechanisms have been used on the steering columns. U.S. Pat. Nos. 6,481,310 and 6,591,709 describe two such systems. Many prior art adjustment mechanisms are complex and require numerous parts. Thus, there is needed a simplified adjustment mechanism.

SUMMARY OF THE INVENTION

The invention is a steering column tilt adjusting system that includes dual toothed racks that are locked and unlocked through profiled slots with pins or arms. These pins or arms are attached to sliding plates that contain the racks to create a self-contained tilt locking system. The length of the device is unlocked, adjusted and relocked to cause the steering column steering wheel to be repositioned as the driver wants. More specifically, steering column tilt adjusting system releasably locks a steering column assembly. The pawl is pivotally coupled to the rack and may be pivotally and slidably moved between fully compressed and fully extended positions. The system includes a pawl, a rack, and a pair of side slide plates. Each of the pawl and the rack support a set of rack teeth. The pawl and rack, which are slidable relative to one another, permit adjustment of the system to a fully compressed locked position (teeth of the pawl engaging the teeth of the rack), a fully compressed unlocked position (the teeth of the pawl and those of the rack are not engaged), a fully extended unlocked position (the teeth are not engaged) or a fully extended locked position (the teeth of the pawl engaging the teeth of the rack). In operation, the length of the adjustment system is unlocked, adjusted and relocked to cause the steering column steering wheel to be repositioned as the driver wants.

In one embodiment, titling of the steering column may be achieved by moving an actuation lever by manually pushing or pulling a column tilt lever handle or other similar device. The tilting of the steering column may also be achieved by electrically activating an actuation device of the type described above. The actuation lever is held in the unlocked position, which drives a pair of side slide plates to move and disengage the pawl and rack teeth. The steering wheel is then free to be repositioned. For example, the steering wheel may be repositioned manually, electrically or using pyrotechnics. The steering column is then relocked by releasing the actuation lever and allowing a spring to slide the offset slide and the flat slide plate so as to re-engage the pawl and rack teeth. One of ordinary skill in the art will appreciate that the spring may be replaced by known devices capable of providing the locking force between the pawl and rack teeth.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE INVENTION

A detailed description of the present invention is described herein with reference to the accompanying drawing figures. Terms of reference such as "top," "bottom," "front," "back," or "side" are used to facilitate an understanding of the present invention in view of the accompanying figures. The identified reference terms or other similar terms are not intended to be limiting, and one of ordinary skill in the art will recognize that the present invention may be practiced in a variety of spatial orientations without departing from the spirit and scope of the invention.

Figure 1:
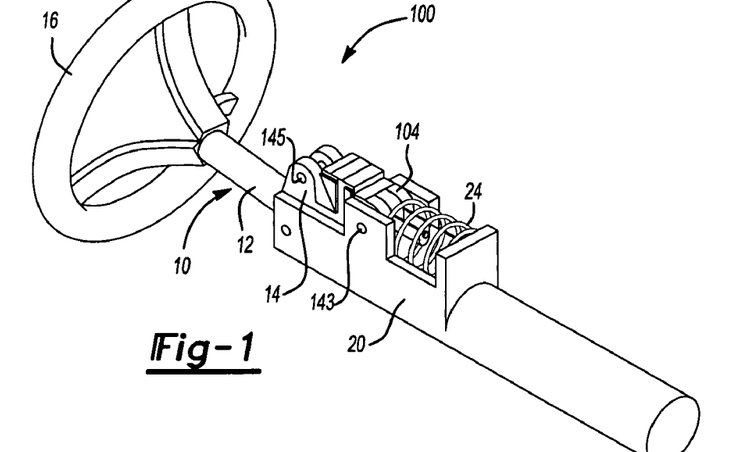
FIG. 1 is a perspective view of a steering column assembly having a tilt adjusting apparatus constructed in accordance with the teachings of the present invention.
Figure 2A:
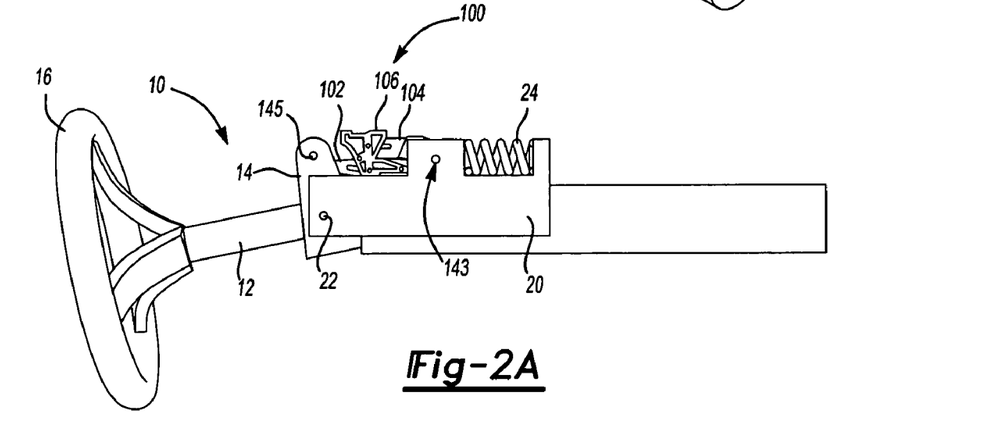
FIG. 2a is a side view of the steering column assembly of FIG. 1.

With reference to FIGS. 1 and 2a of the drawings, a steering column tilt adjusting system constructed in accordance with the teachings of the present invention is generally indicated by reference numeral 100. The steering column tilt adjusting system 100 is illustrated in operative association with a portion of a steering column assembly 10 having a steering wheel 16 coupled to the steering column shaft 12 using known techniques.

Figure 2B:
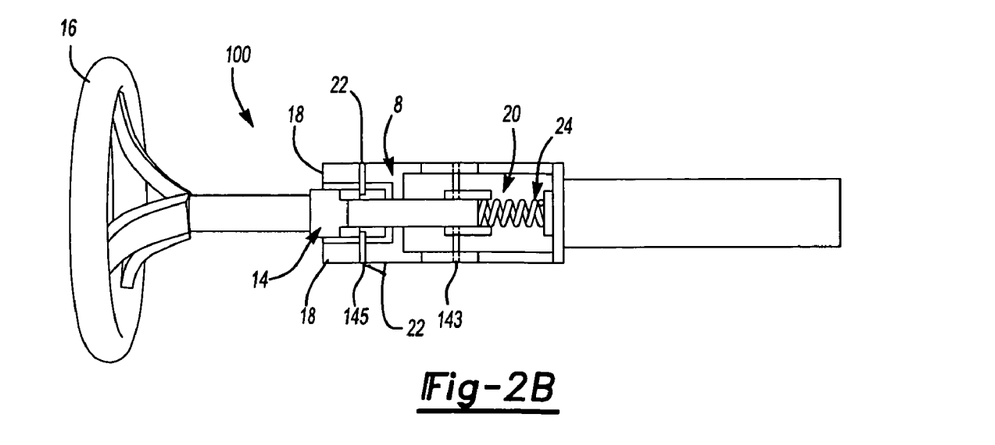
FIG. 2b is a plan view of the steering column assembly of FIG. 1.

For example, with reference to FIGS. 1 and 2a of the drawings, the steering column tilt adjusting system constructed in accordance with the teachings of the present invention is generally indicated by reference numeral 100. The steering column tilt adjusting system 100 is illustrated in operative association with a steering column assembly 10 having a steering column shaft 12 mounted in a housing 14, with a steering wheel 16 on the upper end of the steering column shaft 12. As shown in FIG. 2b, the steering column housing 14 extends between a pair of trunnions 18 that are formed on a support structure 20 and is pivoted to the trunnions 18 by horizontal pivots 22 for vertical adjustment about an axis perpendicular to the longitudinal center line of the vehicle and of the steering column shaft 12. The pivotal support for the housing 14 permits the steering column 12 to be adjusted vertically to a position desired by the vehicle operator, but within a range in which the steering column extends at an angle generally upwardly and downwardly from the motor vehicle. A coil spring 24 is secured at its ends to the support structure 20 and to the housing 14 and urges the housing 14 to swing upwardly to a limiting position making ingress to and egress from the vehicle easier for the vehicle operator. U.S. Pat. No. 6,591,709 describes a similar method for coupling a steering column tilt lock apparatus to a vehicle, the discussion of which is incorporated herein by reference.

Figure 3:
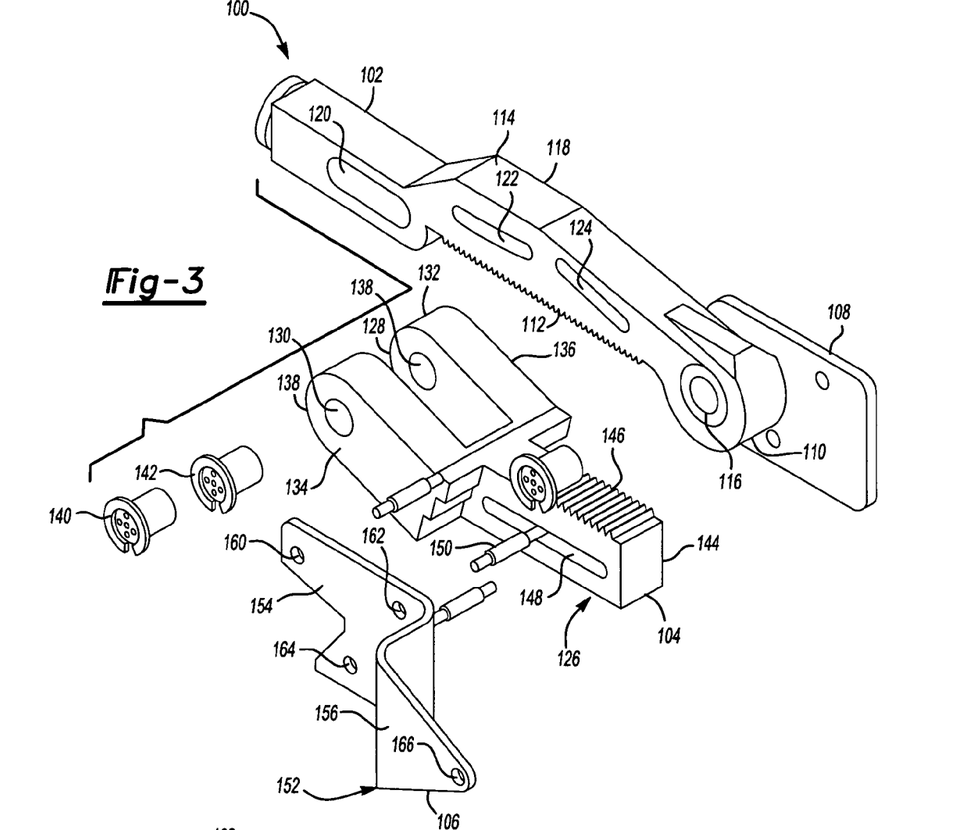
FIG. 3 is an exploded view of the steering column tilt adjusting apparatus of FIG. 1.

FIG. 3 shows an exploded view of the steering column tilt adjusting system 100 built in accordance with the teachings of this invention. As best seen in FIG. 3, the steering column tilt adjusting system 100 includes a rack 102, a pawl 104, an offset slide 106 and a flat slide 108.

As best seen in FIG. 3, the rack 102 includes a first trunnion 110, a plurality of teeth 112 and a locking cam 114. The first trunnion 110 defines a first pivot aperture 116. In the particular example provided, the rack 102 has a gooseneck configuration, wherein the teeth 112 are spaced axially apart from the first trunnion 110. The locking cam 114 is defined by a portion of the rack 102. As illustrated, the locking cam 114 defines slots 122 and 124, as best seen in FIG. 3. Rack 102 also includes a slot 120 that supports a mounting pin 143 such that the mounting pin 143 couples the steering column tilt adjusting system 100 to the steering column assembly 10.

As best seen in FIG. 3, the pawl 104 includes a body 126, and the body 126 is illustrated to include a U-shaped portion 128. As best seen in FIG. 3, the U-shaped portion 128 defines a pair of trunnions 130, 132 that are positioned on opposite sides 134, 136 of the body 126. The trunnions 130, 132 include an aperture 138 that is configured to receive a bushing 140, 142, respectively. When assembled, the bushings 140, 142 will receive and support a mounting pin 143, as best seen in FIGS. 1 and 2. The mounting pin 143 couples the pawl 104 to the rack 102 in a manner that permits pivotal and sliding motion between the pawl 104 and the rack 102.

The body 126 also includes an elongated member 144 that extends outwardly in a direction opposite the trunnions 130, 132. The elongated member 144 supports a plurality of teeth 146. The body 126 also defines a slot 148, as best seen in FIGS. 3, 4 and 8-11, that is offset from and below the teeth 146.

Figure 4:
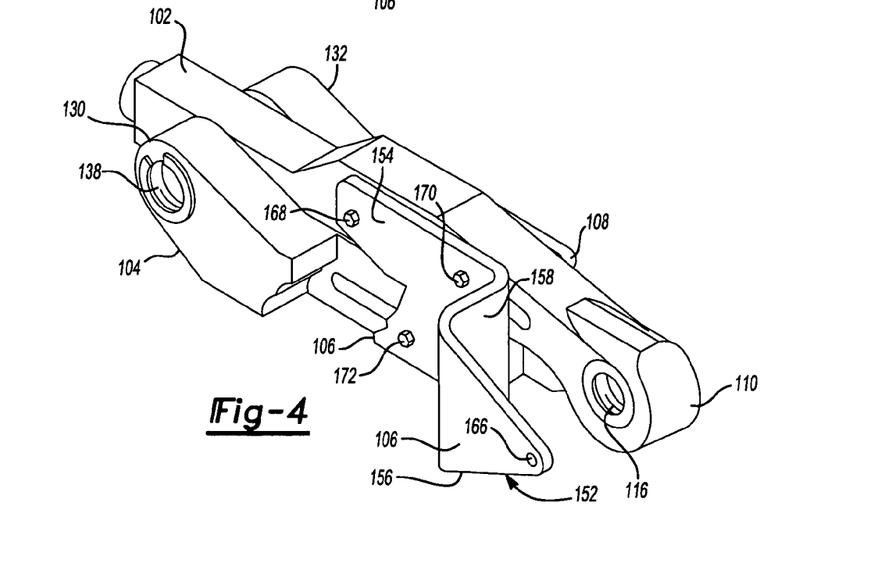
FIG. 4 is a perspective view showing an assembly view of the steering column tilt adjusting apparatus of FIG. 1.

As best seen in FIGS. 3 and 4, the offset slide 106 includes a body portion 152 that includes a flat plate portion 154 and an offset flanged-shaped portion 156 joined to the flat shaped portion by an outwardly projecting wall 158. As illustrated, the body portion 152 may be integrally formed.

Figure 6:
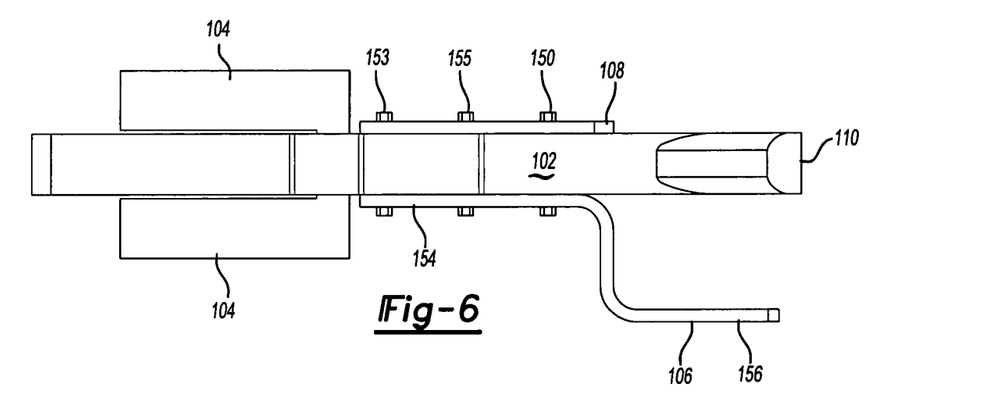
FIG. 6 is a plan view of the steering column tilt adjusting apparatus of FIG. 1 illustrating the relationship between the offset slide and the flat slide.
Figure 7:
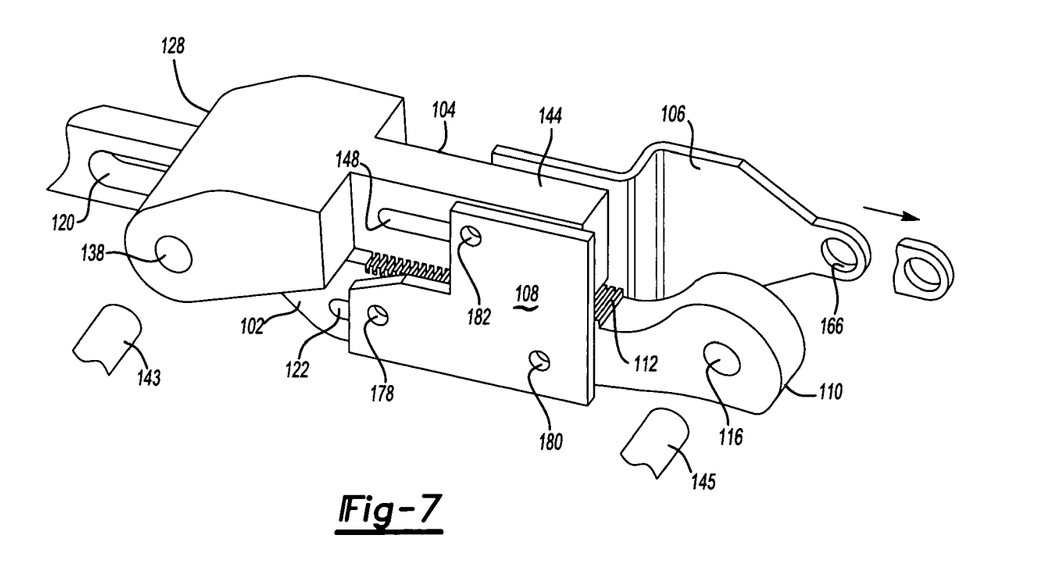
FIG. 7 is a perspective view of the steering column tilt adjusting apparatus of FIG. 1 illustrating pawl teeth in meshing engagement with the rack teeth and the coupling of the pawl and the rack.
Figure 8:
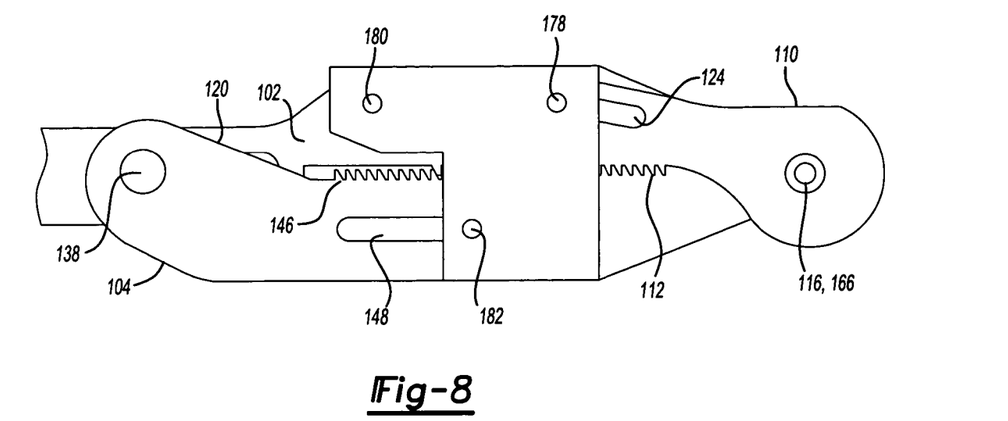
FIG. 8 is an elevation view of the assembly shown in FIG. 7, illustrating the steering column tilt adjusting apparatus in the fully compressed and locked position.
Figure 9:
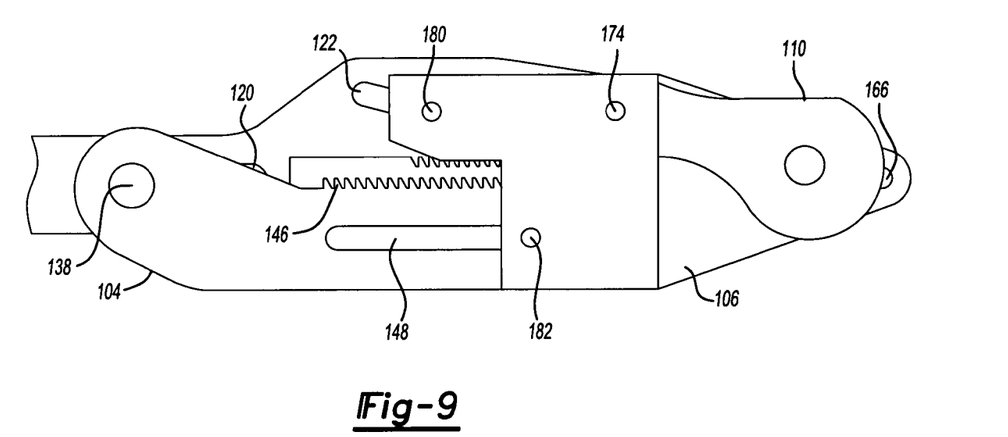
FIG. 9 is an elevation of the assembly shown in FIG. 7, illustrating the steering column tilt adjusting apparatus in the fully compressed unlocked position.
Figure 10:
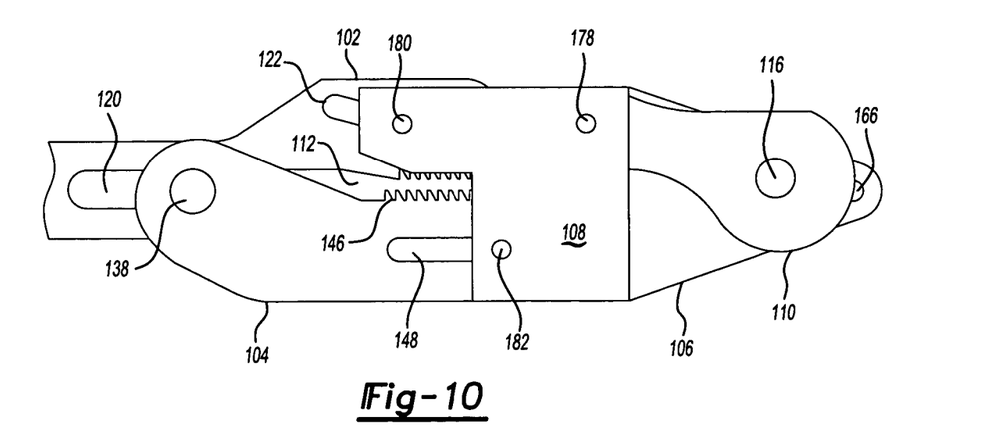
FIG. 10 is an elevation of the assembly shown in FIG. 7, illustrating the steering column tilt adjusting apparatus in the fully extended unlocked position.
Figure 11:
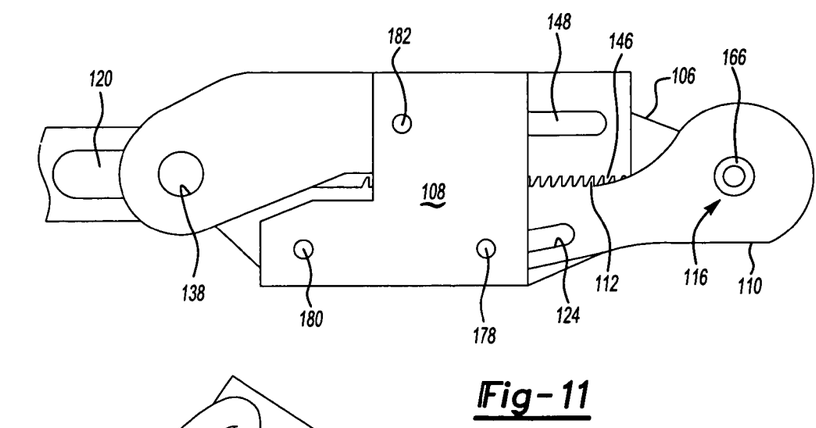
FIG. 11 is an elevation of the assembly shown in FIG. 7, illustrating the steering column tilt adjusting apparatus in the fully extended locked position.

The flat plate portion 154 defines openings 160, 162, and 164, which receive, respectively, coupling pins 150, 153 and 155, as best seen in FIG. 6. The offset flanged-shaped portion 156 also defines an opening 166. As best seen in FIGS. 3, 4 and 8-11, this arrangement slidably couples the pawl 104 and the rack 102.

Figure 5:
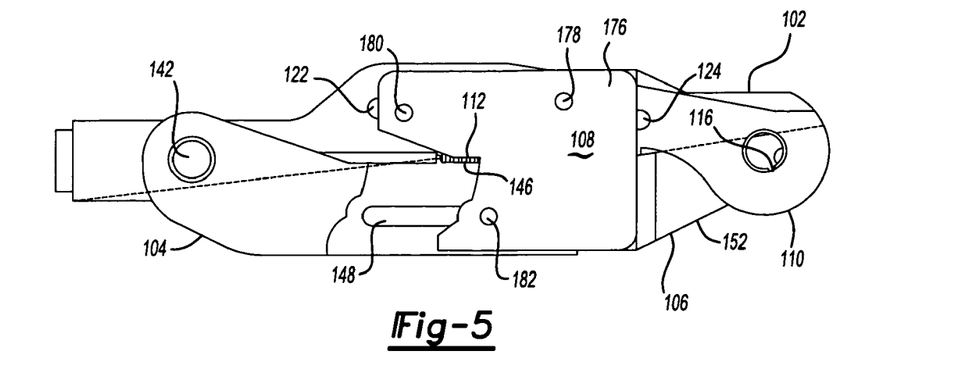
FIG. 5 is an assembly view of the steering column tilt adjusting apparatus shown in FIG. 1, illustrating the position of the flat slide.

As best seen in FIGS. 3 and 5, the flat slide 108 includes a body 176. As illustrated the body 176 is a rectangular plate. The body 176 defines three openings 178, 180 and 182, wherein openings 178 and 182 align, respectively, with the openings 122 and 124 defined by the rack 102. As best seen in FIG. 6, the openings 178, 180 and 182 receive mounting pins 153, 155 and 150 such that the joined parts are permitted sliding and pivotal movement relative to one another.

The components of the steering column tilt adjusting system 100 can be formed for example of plastic, powered metal, stamped or machine steel materials. Non-ferrous or plastic materials can be used for low load applications. However, it will be appreciated by one of ordinary skill in the art that the material requirements may vary depending on the application and the environment in which the steering column tilt adjusting system 100 may be used.

Assembly and Operation

The steering column tilt adjusting apparatus 100 may be installed in a steering column using two pivot pins or bolts or pivot sockets that support tensile and compressive loads. As best seen in FIGS. 1, 2a and 2b, the steering column tilt adjusting apparatus 100 may be coupled to the steering column assembly 10 by inserting a mounting pin 145 in the first coupling aperture 116 (FIG. 3) defined by the rack 102 so as to couple the rack 102 to the steering column assembly 10. As previously discussed, the mounting pin 143 couples the pawl 104 to the rack 102 in a manner that permits pivotal and sliding motion between the pawl 104 and the rack 102. The mounting pin 143 also couples the steering column tilt adjusting apparatus 100 to the steering column assembly 10.

Turning to FIG. 3, the steering column tilt adjusting apparatus 100 may be operated by coupling an actuation lever (not shown), cable or other known actuation means or device to the offset slide 106. More specifically, the actuation lever may be supported in an aperture 166 formed in the offset slide 106 using techniques known to one of ordinary skill in the art. The actuation lever pushes against the inner surface of aperture 166, causing movement of the offset side plate 106 and the flat slide plate 108 along the axis of the rack 102 and pawl 104. In one embodiment, the connection point for the actuation lever is concentric with the pivot point in the tilt head.

Figure 12:
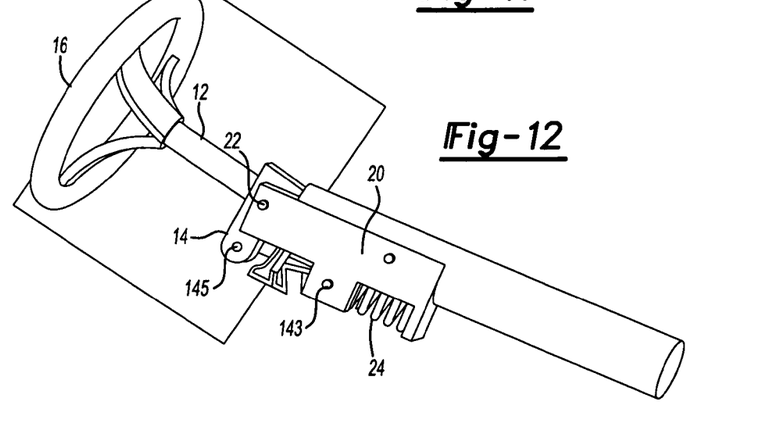
FIG. 12 is a perspective view of the steering column having a tilt adjusting apparatus shown in FIG. 1 illustrating the steering column in the "tilt-up" position.
Figure 13:
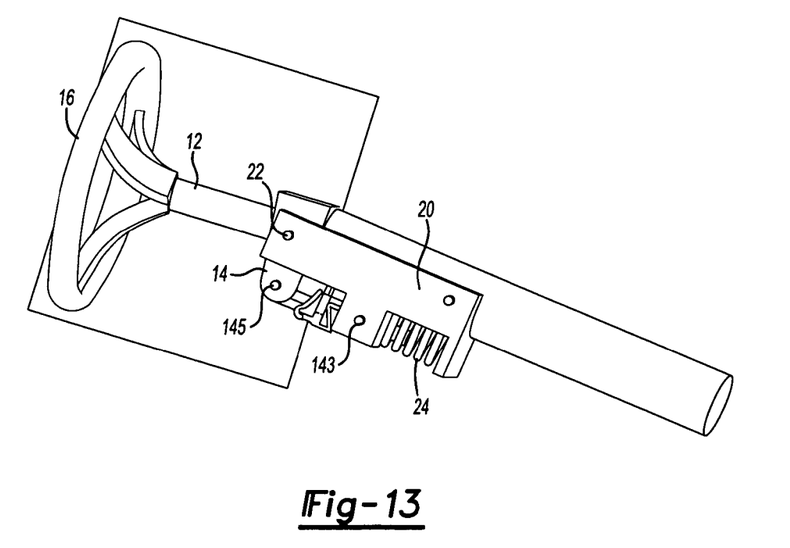
FIG. 13 is a perspective view of the steering column having a tilt adjusting apparatus shown in FIG. 1 illustrating the steering column in the "tilt-down" position.

In one embodiment, titling of the steering column may be achieved by pushing or pulling the actuation lever. The lever is held in the unlock position, which drives the offset slide and the flat slide to move and disengage meshed rack and pawl teeth 146, 112, respectively. The steering wheel 16 is then free to be repositioned. For example, the steering wheel 16 may be repositioned in either the tilt-up or tilt-down positions shown in FIGS. 12 and 13 or any desirable position therebetween.

The travel of the steering column assembly 10 may be limited by the configuration of the slot 120 defined by the rack 102 and the size of a mounting pin 143. For example, when the steering column assembly 10 is repositioned, the pin 143 will strike against the end of the slot 120, thus acting as a stop in either direction of travel along the slot 120. The steering column assembly 10 is then relocked by releasing the tilt lever and allowing a spring 24 (FIG. 2a, 2b) to slide the offset slide plate 106 so as to re-engage the teeth 146, 112.

Alternative Embodiment

Figure 14:
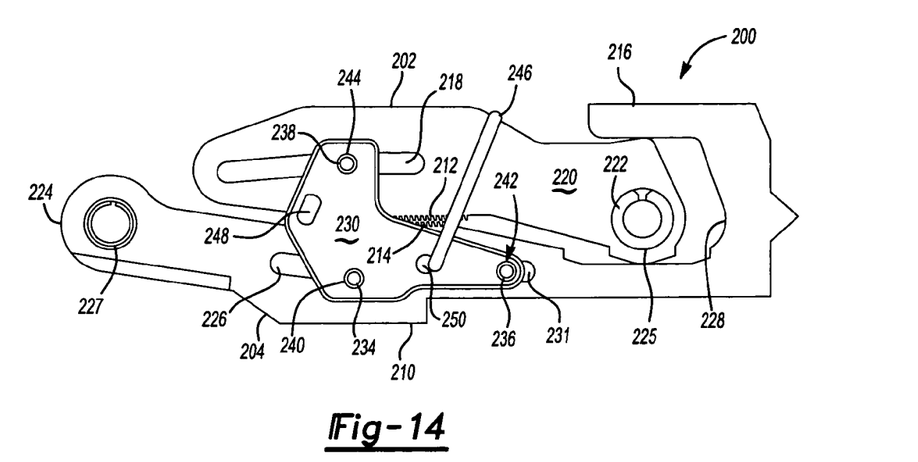
FIG. 14 is an elevation view of another embodiment of a steering column tilt adjusting apparatus formed in accordance with the teachings of this invention.

FIG. 14 illustrates another embodiment of a steering column tilt adjusting system 200 formed in accordance with the teachings of the present invention. The function and operation of the steering column tilt adjusting system 200 are identical to that described for the steering column tilt adjusting system 100. However, the physical configuration of the components comprising the steering column tilt adjusting system 200 is slightly different. As best seen in FIG. 14, the steering column tilt adjusting system 200 includes a pawl 202, a rack 204 and a pair of side slide plates 230, 232.

As best seen in FIG. 14, the pawl 202 includes an elongated body 220. The pawl body 220 defines a trunnion mount 222, a plurality of pawl teeth 212, and a slot 218. The trunnion 222 defines an opening 225 for receiving a bushing. In one embodiment, the trunnion 222 may be coupled to the steering column so as to permit rotation of the pawl relative to the steering column.

As shown in FIG. 14, the rack 204 includes an elongated body 210. The rack body 210 includes a distal end that defines a trunnion mount 224, a slot 226 and a C-shaped end 216 formed at the distal end of the body 210. The trunnion mount 224 defines an opening 227 for receiving a bushing. The C-shaped end defines an inner surface 228.

Figure 15:
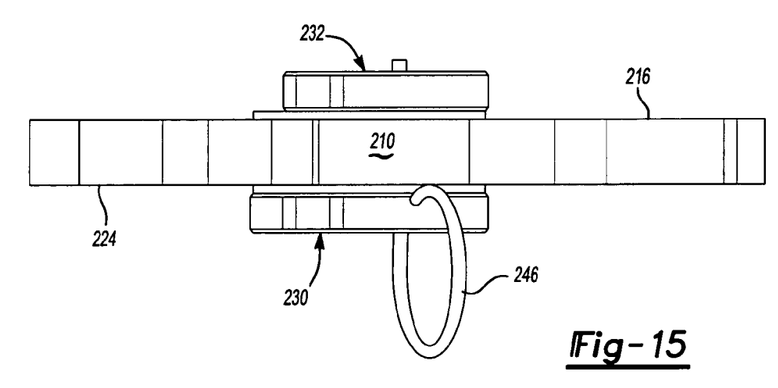
FIG. 15 is a top plan view of the steering column tilt adjusting apparatus shown in FIG. 14.

The steering column tilt adjusting system 200 also include side slide plates 230, 232, as best seen in FIGS. 14 and 15. The side slide plates 230, 232 are virtually mirror images, except, as best seen in FIG. 14, that the plate 230 includes an opening 248 for receiving an end of an actuation lever (not shown). Each plate 230, 232 defines openings 234, 236, 238. When the side slide plates 230, 232 are assembled, the openings 234, 236, 238 in each plate are aligned axially. Each opening 234, 236, 238 supports a pin 240, 242, 244, respectively, for coupling the respective side slide plate 230, 232 to the pawl 202 and rack 204 as best seen in FIG. 14. For example, in one embodiment, the pins 240 and 242 are received in openings 234 and 236 formed in plate 230, the slot 226, 231, respectively, formed in the rack 204 and finally the respective openings 234 and 236 of the plate 232. The pin 244 is received in opening 238 formed in plate 230, the slot 218 formed in the pawl 202 and in the opening 238 of the plate 232. The pins 240, 244, 246 are received in the respective slots 218, 226 and the openings 234, 236, 238 so as to permit the plates 230, 232 to slide along the slots 218, 226.

In the illustrated embodiment, when the side slide plates 230, 232 are assembled as described, the pawl teeth 212 releasably engage the rack teeth 214. The trunnion mount 222 also nests in the C-shaped end 216 at the inner surface 228.

Assembly and Operation

The steering column tilt adjusting system 200 is coupled to the steering column assembly 10 in the manner previously described herein and as described in U.S. Pat. No. 6,591,709, incorporated herein by reference, and using techniques known to one of ordinary skill in the art. With reference to FIGS. 1, 2a, 2b and 14 for example, in an alternative method of coupling the steering column tilt adjusting system 200 to a steering column, the pawl trunnion mount 222 may receive a pin 143 through opening 225 that couples the pawl trunnion mount 222 to the steering column assembly 10. The rack trunnion mount 224 may receive a pin 145 through opening 227 that pivotably couples the rack trunnion mount 224 to the steering column assembly 10. One of ordinary skill in the art will appreciate that the pawl 202 and rack 204 may be assembled in the steering column such that the pawl 202 is pivotably coupled to the steering column assembly 10, and the rack 204 is coupled to the fixed portion of the steering column assembly 10.

In the embodiment shown in FIGS. 14 and 15, the steering column tilt adjusting system 200 is operated by applying a force to the actuation lever (not shown). One of skill in the art will appreciate that the actuation lever (not shown) may be replaced by an actuation cable, hydraulic piston assembly or other devices for applying a forces on the side slide plates 230, 232 so as to permit movement of the side slide plates 230, 232 to slide along the axis of the slots 218, 226.

The actuation lever may be supported in an aperture 248 formed in the side slide plate 230 using techniques known to one of ordinary skill in the art. The actuation lever pushes against the inner surface of 248, causing the side slide plates 230, 232 to move along the axis of the rack 204 and pawl 202.

By applying pressure to the actuation lever, the side slide plates 230, 232 are permitted to slide along the axis of slots 218 and 226 to the unlocked position. This action permits the pawl teeth 212 and the rack teeth 214 to disengage (unlock). Once the side slide plates 230, 232 are slid to the unlocked position, the rack 204 may slide along the axis of the pawl 202. Once the steering column assembly 10 is in the desired position, a force is applied the lever causing the side slide plates 230, 232 to be slid to the locked position. This action results in the meshing engagement of the pawl and rack teeth, 212, 214.

Finally, the steering column tilt adjusting system 200 may be shipped with a shipping pin 246 inserted in opening 250 to prevent movement of the side slide plates 230, 232 during shipping.

Figure 16:
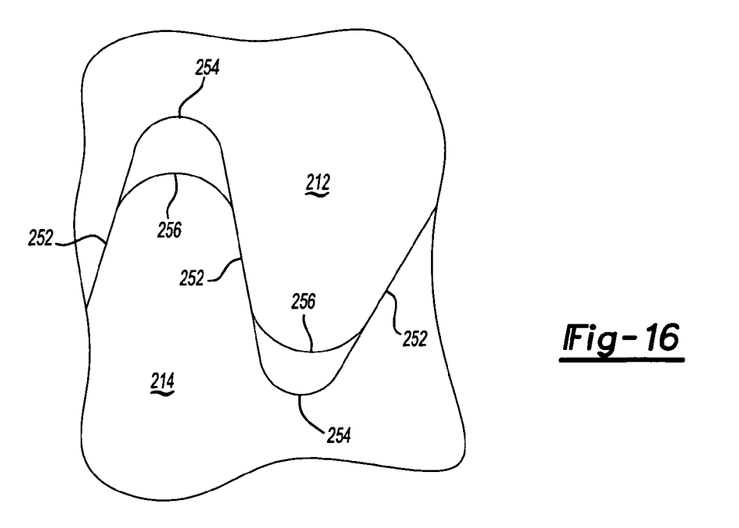
FIG. 16 is a section view illustrating the contact points between meshing teeth.

The present invention as illustrated herein as exemplary embodiments 100 and 200 provides several advantages over prior art steering column tilt adjusting systems. For example, one advantage is that the opposing pawl and rack teeth geometry is set up such that the teeth surfaces that support the high deceleration loads created in a crash event are adjusted towards or are perpendicular to the load path in the rack and pawl. Another illustrative advantage is that the rack and pawl teeth surfaces may be designed such that the deceleration loads are intended to force the steering column tilt adjusting system into locking engagement during a crash event. A further illustrative advantage is that the locking loads applied to lock the rack and pawl teeth may be tunable by adjusting the angle and/or configuration of the slots 122, 124, 148 (FIG. 3) in the first embodiment and 218, 226, 231 (FIG. 14) in the second embodiment. An additional advantage is that the profiled slots (122, 124, 148 in the first embodiment (FIG. 3) and 218, 226, 321 in the second embodiment (FIG. 14)) in the pawl and rack may be tunable to allow the locking and unlocking lever efforts to be adjusted. As shown in FIG. 16, another advantage is that the rack and pawl teeth, 214, 212 may be configured to account for wear between contact points 252. As the contact points 252 wear, the root 254 of the teeth moves closer to the tip 256 of opposing teeth. Therefore the teeth 214, 212 further engage to compensate for wear. In addition to self correcting for tooth wear, the present invention also permits the slots 226, 231 (FIG. 14) to be configured to allow additional travel of the slide plates 230, 232 to accommodate wear in the teeth 212, 214, pins 240, 242, 244, and slots 218, 226, 231. One of skill in the art will appreciate that the disclosed invention includes additional advantages that are not set forth above.

Although a detailed description of the present invention has been disclosed, a person of ordinary skill in the art would realize, however, that certain modifications would come within the teachings of this invention. Therefore, the following claims should be studied to determine the true scope and content of the invention.

What is claimed:

1. A steering column tilt adjusting system, comprising:
a pawl including a body, the body defining a first trunnion mount, a first slotted opening and a plurality of pawl teeth;
a rack including a body, the body defining a second trunnion mount, a second set of slotted openings and a plurality of rack teeth, the second trunnion mount and the rack teeth being configured to meshingly engage the pawl teeth; and
a pair of side slide plates that slidably engage the rack and pawl, causing the rack teeth to meshingly engage or to disengage the pawl teeth,
wherein sliding the pair of side plates along the axis of the first slotted opening and the second set of slotted openings disengages the rack and pawl teeth permitting the rack to slide along the axis of the pawl and whereas sliding the pair of slide plates along the axis of the first and second slotted openings engages the rack and pawl teeth limiting movement between the rack and the pawl.

2. The steering column tilt adjusting system as defined in claim 1, the first slotted opening and the second set of slotted openings being configured to permit a locking load applied to engage the rack and pawl teeth to be tunable by adjusting at least on of the angle and configuration of the first slotted opening and the angle of the second set of slotted openings.

3. A steering column tilt adjusting system, comprising:
a pawl including a body, the body defining a first trunnion mount, a first slotted opening and a plurality of pawl teeth;
a rack including a body, the body defining a second trunnion mount, a second set of slotted openings, wherein the slots comprising the second set of slotted openings are divergenly opposed, the body further comprising a plurality of rack teeth, the second trunnion mount and the rack teeth being configured to meshingly engage the pawl teeth; and
a pair of side slide plates that slidably engage the rack and pawl, causing the rack teeth to meshingly engage or to disengage the pawl teeth,
wherein sliding the pair of side plates along the axis of the first slotted opening and the second set of slotted openings disengages the rack and pawl teeth permitting the rack to slide along the axis of the pawl and whereas sliding the pair of slide plates along the axis of the first and second slotted openings engages the rack and pawl teeth limiting movement between the rack and the pawl.

4. A steering column tilt adjusting system, comprising:
a pawl including a body having a distal end, the distal end defining a first trunnion mount, the body further comprising a first slotted opening and a plurality of pawl teeth;
a rack including a body having a distal end and a proximal end, the distal end defining a second trunnion mount and the proximal end defining a C-shape end, a second set of slotted openings and a plurality of rack teeth formed between the distal and proximal ends, the second trunnion mount and the rack teeth being configured to meshingly engage the pawl teeth; and
a pair of side slide plates that slidably engage the rack and pawl, causing the rack teeth to meshingly engage or to disengage the pawl teeth,
wherein sliding the pair of side plates along the axis of the first slotted opening and the second set of slotted openings disengages the rack and pawl teeth permitting the rack to slide along the axis of the pawl, wherein the distal end of the pawl nests in the C-shape end defined by the rack and whereas sliding the pair of slide plates along the axis of the first and second slotted openings engages the rack and pawl teeth limiting movement between the rack and the pawl.

5. The steering column tilt adjusting system as defined in claim 4, the first slotted opening and the second set of slotted openings being configured to permit a locking load applied to engage the rack and pawl teeth to be tunable by adjusting the angle of the first slotted opening and the angle and/or configuration of the second set of slotted openings.

* * * * *